United States Patent [19]
Aylor

[11] Patent Number: 5,951,249
[45] Date of Patent: *Sep. 14, 1999

[54] SELF GOVERNING FLUID ENERGY TURBINE

[75] Inventor: Elmo Edison Aylor, Yerington, Nev.

[73] Assignee: Prime Energy Corporation, Gardnerville, Nev.

[ * ] Notice: This patent is subject to a terminal disclaimer.

[21] Appl. No.: 08/986,901

[22] Filed: Dec. 8, 1997

Related U.S. Application Data

[63] Continuation of application No. PCT/US95/07552, Jun. 8, 1995, which is a continuation of application No. 08/143,471, Oct. 26, 1993, Pat. No. 5,425,619.

[51] Int. Cl.⁶ .......................................................... F03D 7/04
[52] U.S. Cl. ................................. 416/42; 416/44; 416/53; 416/117; 416/118; 416/132 B
[58] Field of Search ..................... 416/9, 12, 16, 416/17, 36, 37, 44 R, 44 A, 41 R, 41 A, 42, 46, 53 R, 53 A, 117, 118, 119, 132 B; 415/2.1, 4.1, 4.2, 4.3, 4.5, 905, 907, 908

[56] References Cited

U.S. PATENT DOCUMENTS

| | | | |
|---|---|---|---|
| 4,048,947 | 9/1977 | Sicard | 416/119 |
| 4,781,523 | 11/1988 | Aylor | 415/2.1 |
| 5,425,619 | 6/1995 | Aylor | 416/42 |
| 5,591,004 | 1/1997 | Aylor | 416/42 |
| 5,632,599 | 5/1997 | Townsend | 416/42 |

FOREIGN PATENT DOCUMENTS

| | | | |
|---|---|---|---|
| 909378 | 5/1946 | France | 416/41 |
| 1038090 | 9/1953 | France | 416/41 |

*Primary Examiner*—Christopher Verdier
*Attorney, Agent, or Firm*—Kolisch, Hartwell, Dickinson, McCormack & Heuser

[57] ABSTRACT

A fluid energy turbine has a radial flow rotor in which fluid driven blades are peripherally distributed about a horizontal axis and in which auxiliary-biased outlet gates are provided for release of high fluid pressures to govern turbine speed such as in high windstorms.

18 Claims, 4 Drawing Sheets

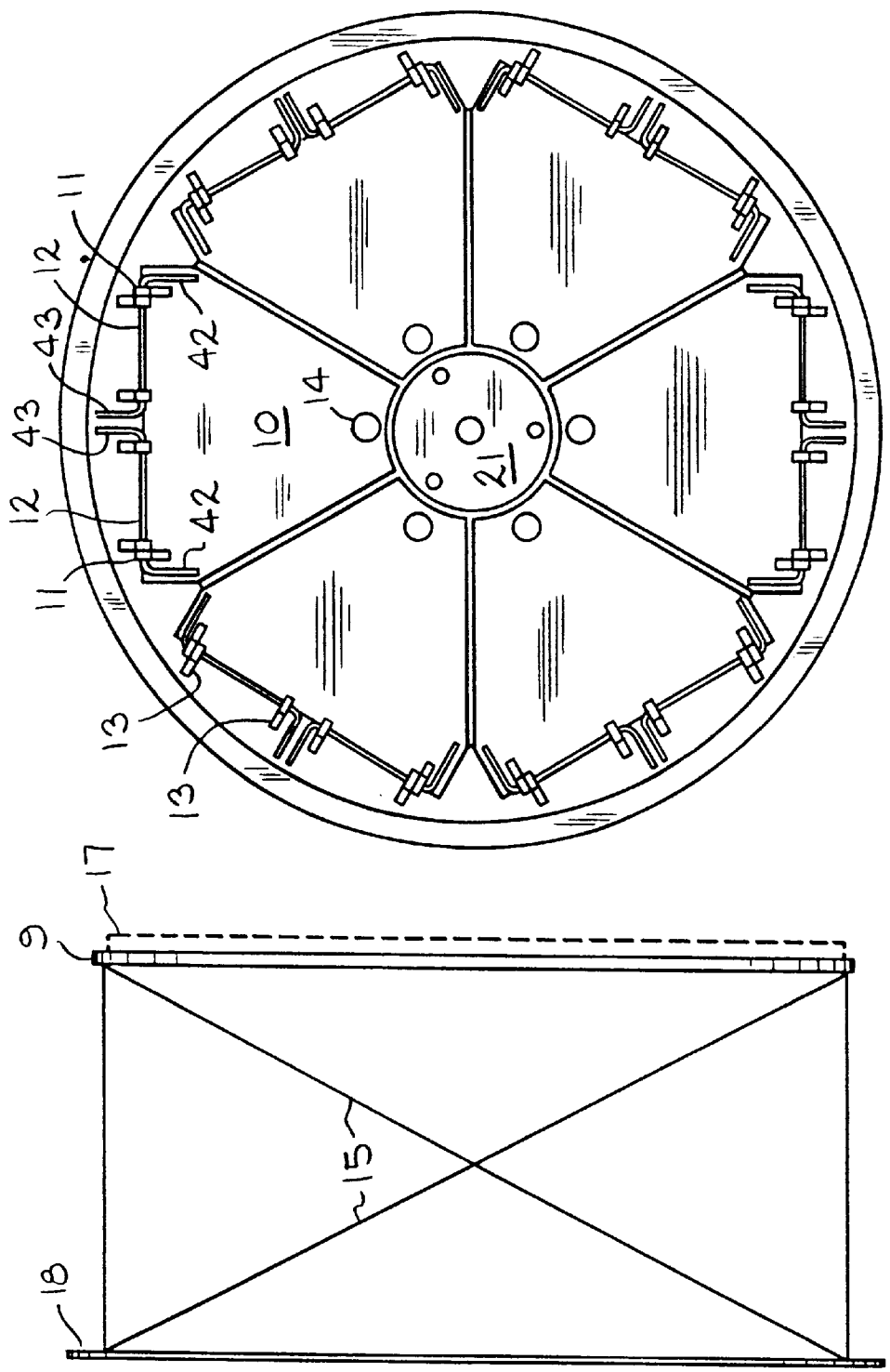

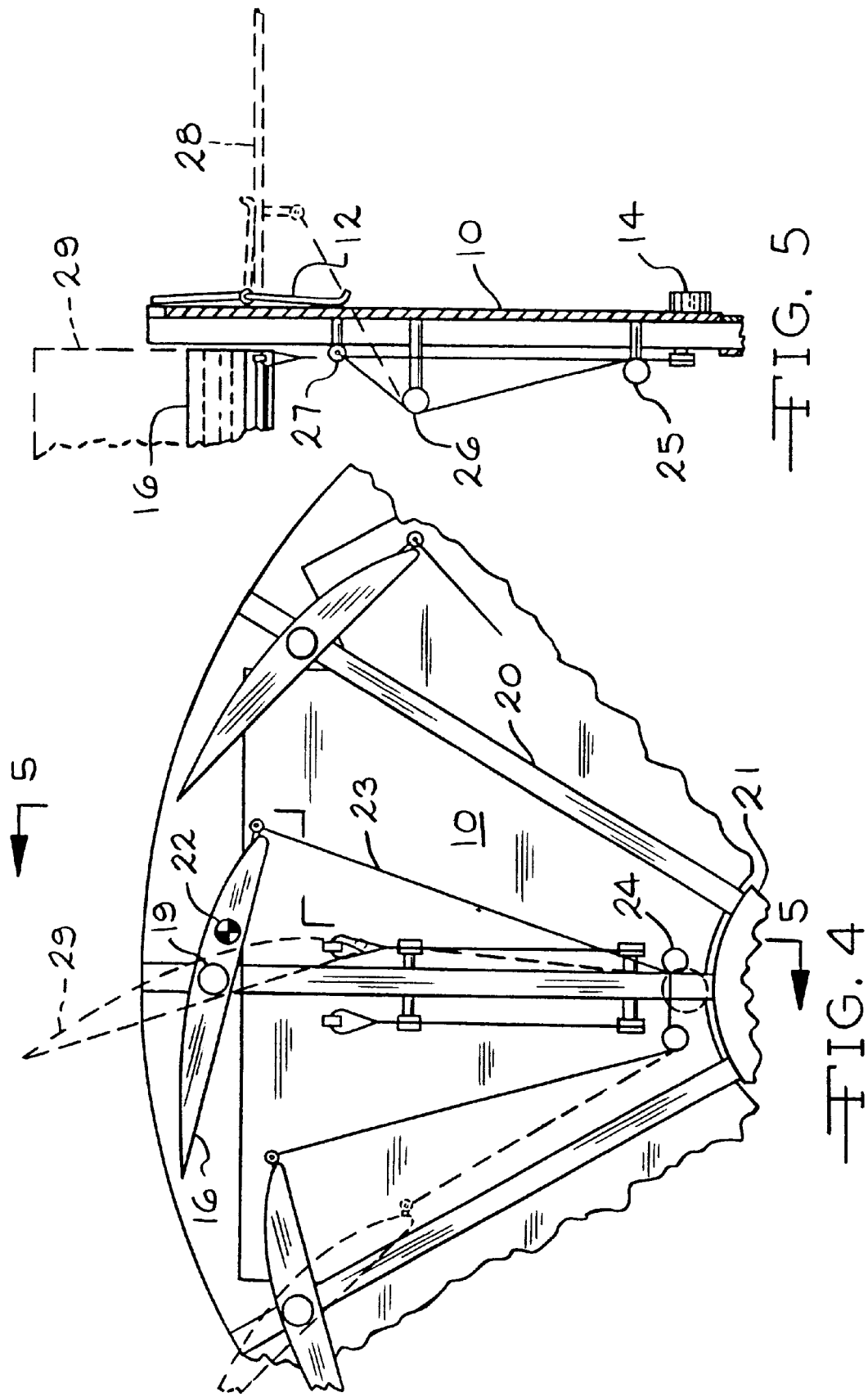

SELF GOVERNING FLUID ENERGY TURBINE

This is a continuation of PCT application Ser. No. PCT/US95/07552, filed Jun. 8, 1995, which is a con. of Ser. No. 08/143,471, filed Oct. 26, 1995, now U.S. Pat. No. 5,425,619, issued Jun. 20, 1995.

BACKGROUND OF THE INVENTION

For centuries and up to the present, many attempts have been made to increase the conversion efficiency and durability of fluid energy converting machines especially as related to use in natural wind as a prime energy source. The power output of most types so far evolved has been overshadowed by the mass production of energy from gas, coal, oil, hydro-electric and nuclear systems, except in remote regions where the output from mass production energy units is not readily available. In recent years in the United States, especially in California, wind farms have proliferated as a result in part, of technology advancements but largely due to former tax subsidies and remaining legislated regulatory provisions.

Contemporary wind turbines as used in California falter economically when tax subsidies are omitted and suffer additionally from inherent vulnerability to capricious gusting winds and delinquent maintenance programs.

The present invention when applied to a pressure conversion turbine offers high conversion efficiency, low maintenance requirements and minimal vulnerability to wind characteristics which plague contemporary systems.

FIELD OF THE INVENTION

Contemporary turbines designed for operation in natural flowing fluids, such as wind, are generally subject to the need to cone with non-constant velocities, or velocities exceeding design limits. The present invention includes a radial flow rotor having a generally axial fluid inlet and fluid outlets between spaced circumferentially distributed blades as well as auxiliary gate outlets and means for controlling flow dynamics and/or for releasing excess flow.

PRIOR ART

Wind turbines of the prior art, in general, have been of two types, namely (1) turbines with radially extending propeller blades having a horizontal axis of rotation and (2) turbines which have a vertical axis of rotation with vertically oriented blades circumferentially spaced about the axis. Hybrid turbines also exist such as the Darrieus rotor turbine which has a vertical axis and blades having both vertical and horizontal directional vectors in a form similar to bowed egg beater type blades extending from spaced points along the axis of rotation.

It is an object of the present invention to provide a fluid energy turbine device capable of efficient conversion of moving fluid energy to useful purposes which surpasses the efficiencies of most other known wind conversion devices, while providing means for governing rotational speed over a wide range of wind velocities.

Another object of the present invention is to provide a low cost durable machine immune to adverse wind conditions and having a low need for maintenance.

A further object of the present invention is to provide means permitting wind power conversion even during high winds or in storms without the usual need under such conditions for total shut down.

A feature of the invention in addition to its capability of operation in extremely high winds is its adaptability to streamlining of air flow thereover for less operational noise than is experienced with open whirling blades which generate tip vortexes.

The invention lends itself particularly to use with radial flow wind turbines represented by the type disclosed in my U.S. Pat. No. 4,781,523 issued Nov. 1, 1988 as well as to use with other wind energy converters wherein air flow channeled to the driving components of the device is adaptable to being bypassed.

SUMMARY OF THE INVENTION

The present invention utilizes a radial flow rotor having a generally horizontal axis of rotation, a forward axial fluid inlet and outlets between a plurality of spaced side-by-side longitudinal fluid engaging blades which have their major directional component extending generally parallel to the rotor axis. In addition a number of auxiliary outlet ports are provided on the aft side of the rotor opposite the Inlet side, each of the ports being sealed against fluid flow by a hinged spring-loaded flap or gate which is closed when the rotor is at rest but is fully opened when a predetermined high flow through the outlets occurs while rotating. In addition, each gate flap is optionally balanced by an attached fly weight or counter weight in such a manner as to permit placement of the resultant center of gravity of the gate assembly at a chosen location away from its hinge pivot. The counterweight can be made adjustable in position for the desired location of the center of gravity by making it slidably positional to permit bringing it closer to the hinge pivot axis and thereby correspondingly provide adjustment for predetermined excess fluid pressures. The effectiveness of the counterweight can be minimized by positioning it close to the hinge pivot axis or alternately by removing it from its support, which in either case causes the biasing action on the gate flap to be reliant principally upon the weight of the flap and the hinged spring loading bearing on the gate flap.

When the center of gravity of the flap assembly is positioned away from the hinge pivot, at some combination of the dynamics of fluid flow and rotational speed, the centrifugal force and flow will move each flap away from its respective sealed relation with its outlet port. When it is determined to be desirable the gate flaps can be made to respond principally to fluid flow alone by adjustment or removal of the counterweight.

If fluid velocity continues to increase, dynamic and static pressures then force the flap to further open the auxiliary port, irrespective of zero or counter forces of the center of gravity. Extreme fluid flow conditions, such as are confronted in a storm, will maintain the flap at its limit of travel, leaving the port fully open for maximum "release" of excess flow. These features in general protect the equipment against storm damage and allow continued power generation and R.P.M. control even in high wind conditions that would otherwise require shut-down.

If further protection is needed, such as when the equipment is likely to be subjected to extremely high winds in known hurricane regions, release of flow from the turbine can be provided by incorporating biasing means which will allow the pitch of the rotor blades to first change to a more passive angular disposition at preselected high wind velocities prior to movement of the flaps to an open position. Alternately the gate flaps and the rotor blades may be optionally inter-connected by means such as cables or push rods, so that movement of the gate flaps and one or more blades will move in coordinated patterned relation to different preselected pitch angles matched to the changes in wind velocity.

It is an object of the present invention to provide a fluid energy turbine device capable of efficient conversion of moving fluid energy to useful purposes which surpasses the efficiencies of most other known wind conversion devices, while providing means for governing rotational speed over a wide range of wind velocities.

Another object of the present invention is to provide a low cost durable machine immune to adverse wind conditions and having a low need for maintenance.

Other objects and features which are believed to be characteristic of my invention are set forth with particularity in the appended claims. My invention, however, both in organization and manner of construction, together with further objects and features thereof may be best understood by reference to the following description taken in connection with the accompanying drawings in which:

BRIEF DESCRIPTION OF THE DRAWINGS

FIG. 1 is a rear elevational view of a wind turbine rotor assembly incorporating the present invention;

FIG. 2 is a side elevational view of the wind turbine rotor assembly shown in FIG. 1;

FIG. 4 is an enlarged view of the broken away section of the rotor shown in FIG. 3;

FIG. 5 is a side view of the portion of the rotor shown in FIG. 4 as taken at line 5—5;

DESCRIPTION OF THE PREFERRED EMBODIMENTS

Figure 6:
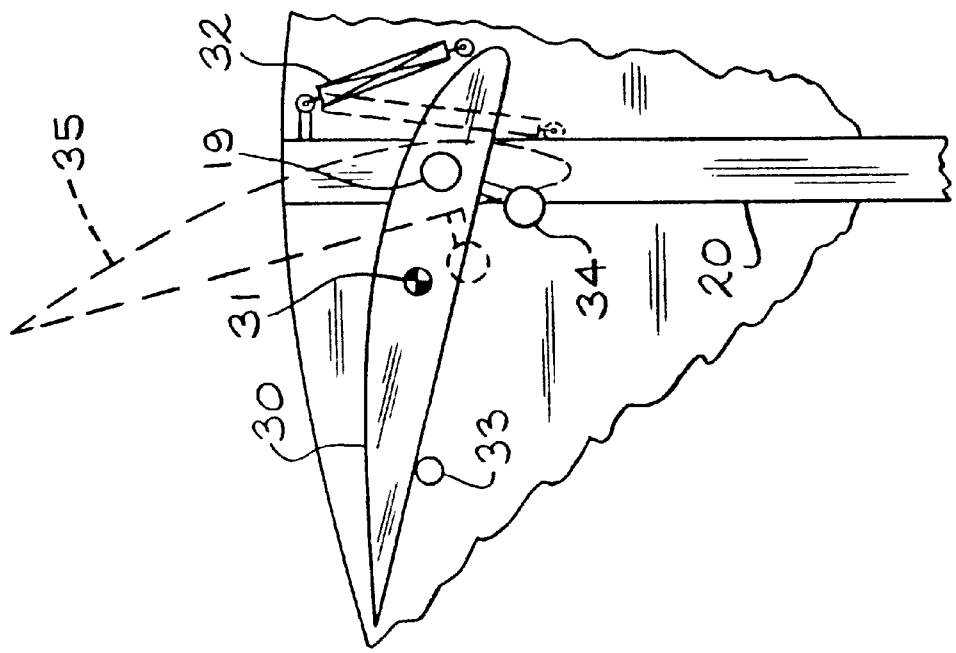
FIG. 6 is a view of a single blade representing an embodiment of the invention incorporating means for passive response to fluid pressure or rotational speed.

Turning to the drawings in greater detail, FIG. 1 is an elevational view of the rear wall of a housing for a radial flow type wind turbine rotor 9 incorporating wind gate flaps 10 according to the present invention. Each flap 10 of the six shown is pivotally supported by hinges 11 circumferentially distributed near the outer edge of the rear wall. Torque bar/hinge pins 12 providing the hinge action are supported by brackets 13. The gate flaps 10 thus pivot at a circumferential base to provide an opening near the axial center of the rotor. A fly weight 14 is illustrated located near the radially inward opening tip of each flap 10. Movement of flap 10 about the hinge axis air causes an outboard arm 42 at one end of the torque bar to follow. Upon such movement caused by wind flow into the turbine, the torque bar 12 is blocked from rotation by a radially outwardly extending arm 43 which bears against the wall of the rotor 9, which imposes a twisting balancing force against the air load acting to open the flap 10.

Figure 3:
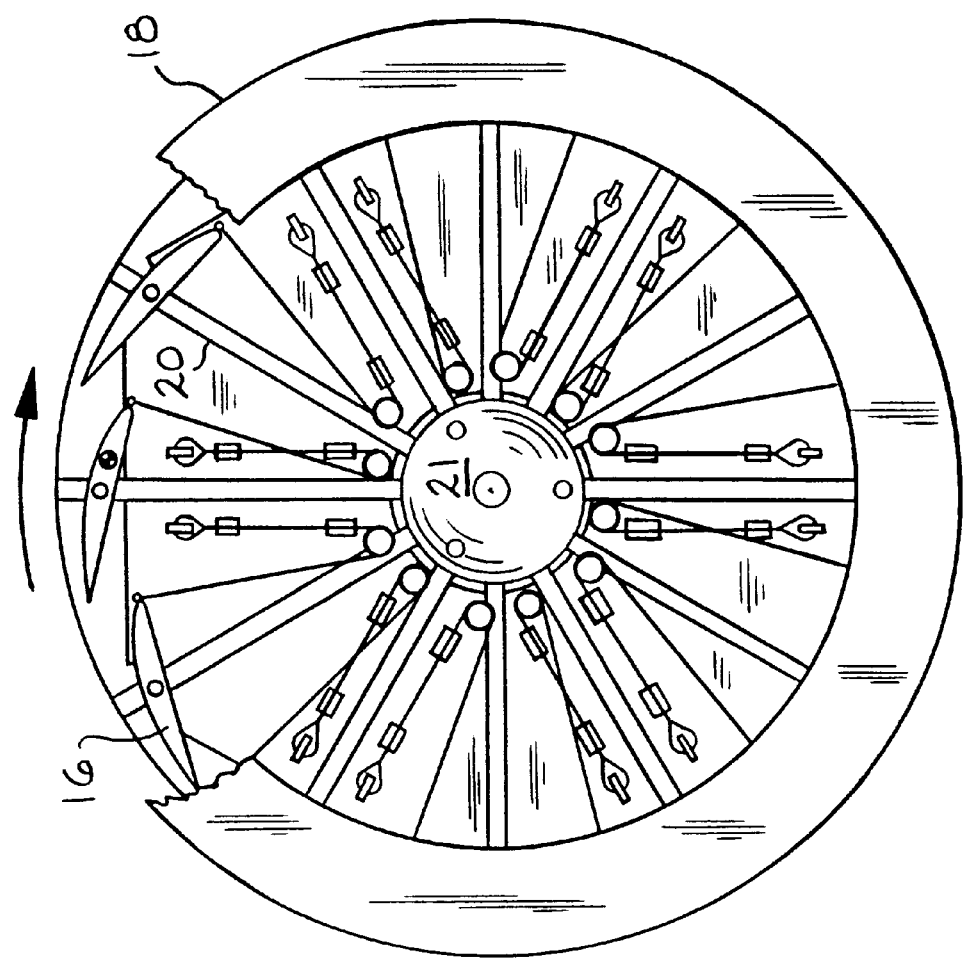
FIG. 3 is a partially broken away front view of the wind turbine rotor of FIG. 1.

FIG. 2 is a side elevation view of the invention shown in FIG. 1 with the large "X" symbol 15 depicting the region occupied by rotor blades 16 shown more clearly in FIGS. 3, 4 and 5. Space 17 represents the region of flaps 10 and their associated torque bar hinge assemblies.

FIG. 3 is a front elevation view of an embodiment of the invention shown in FIG. 1 with a portion of the front entry ring 18 broken away to show three rotor blades 16 and their supporting spars 19. Also shown is an arrangement for inter-connecting the flaps 10 and the blades 16 in the form of cable guide pulleys 24 for cables 23; better shown in FIG. 4, whereby the movement of the flaps and changes in the blade pitch angle are coordinated.

FIG. 4 is an enlarged view of the exposed broken away portion of FIG. 3 showing how each blade 16 is pivotally supported on a rod or tube type spar 19 about which the blade can pivot when acted upon by movement by a respective interconnected flap 10. Each pivot spar 19 is in turn supported by a respective radially extending spoke of a series of spokes 20. Alternate spokes in the series are arranged to match and cover the spacing between adjacent pairs of flaps with which it is associated. The alternate spokes are arranged to function as a flap seat to block air flow between the closed flaps and the spokes 20. The gate flaps 10 are normally closed when the rotor is at rest and is arranged to remain closed up to a preselected level of fluid pressure and/or up to a preselected rotational speed of the rotor 9. The aerodynamic center 22 of the blades is arranged, by appropriate positioning of their pivots and by contouring, to be ahead of their spars 19, which results in application of a counter-clockwise lift torque on the blades at preselected air flow speeds. This torque acts to transmit the lift torque force of each blade to its gate flap 10 by way of a cable system including a cable 23 anchored at the leading edge of blade 16, around pulley 24, and then, as shown in FIG. 5, in succession over pulleys 25 and 26 to a connection 27 on its respective flap 10. Thus the aerodynamic loads acting on the blades 16 establish a balanced relation with the biasing action of torque bars 12 to provide an open operating position of their respective flaps 10 matched to the air flow velocity and speed of rotation of the rotor.

At a chosen preselected air pressure, flap 10 will be forced to break its air sealing contact over its exit port formed with spokes 20, thus allowing passage of air from the rotor. This in turn reduces the static pressure inside the radial flow rotor and consequently reduces the driving torque which would otherwise be produced by the rotor from stronger winds. On the other hand a high wind flow movement of the flaps 10 is transmitted by connecting cables 23 to their respectively associated blades 16 to increase the pitch of the blades during rotor rotation. This increases the gap between blades 16 which further vents air from the rotor interior and reduces internal static pressure.

The steeper pitch of the blades 16 also acts to reduce the rotational speed of the rotor 9 which action continues progressively with increasing wind speeds. At the same time centrifugal force acts on the fly weights 14 to open the flaps which accentuates the action so that ultimately, when the wind is sufficiently strong, the flaps 10 move to a fully open position 28 corresponding to a maximum pitch position 29 of the blades 16. The effects of the aforementioned extreme limit positions of the open flaps 10 and feathered blades 16 are a reduction in loading on the rotor and drag load on a support tower with a reduction in rotational speed relative to the wind velocity.

FIG. 6 depicts an embodiment of the invention in which passively responsive blades 30 are not interconnected to the gate flaps 10 but are self feathering. In this embodiment, the aerodynamic center 31 of the blade 30 is designed by contouring to be located aft of soar 19. The aerodynamic load acts to move the blade clockwise which movement is resisted by a spring 32 anchored to the rotor 9 and connected to blade 30 near its leading edge. A stop member 33 limits the counter clockwise movement of blade 30. A flyweight 34 is provided secured in standoff relation to the underside of the blade which by reason of centrifugal force of rotor rotation acts on the weight to supplement the action of the aerodynamic load. The centrifugal force acting on the weight 34 becomes progressively more dominant as the pitch angle of the blade increases and the aerodynamic force is diminished by reason of a resulting progressively smaller angle of attack on the blades 30. Thus as wind and/or rotational speed of the rotor 9 increases the blade pitch angle ultimately achieves a limit position of the blade 30 illustrated in dashed lines and referred to by the reference numeral 35 which results in a reduced loading on the rotor. It will be recognized that the rotational direction of the rotor depicted by the curved vector arrows is reversible by reversing the pitch angle of the blades.

Figure 7:
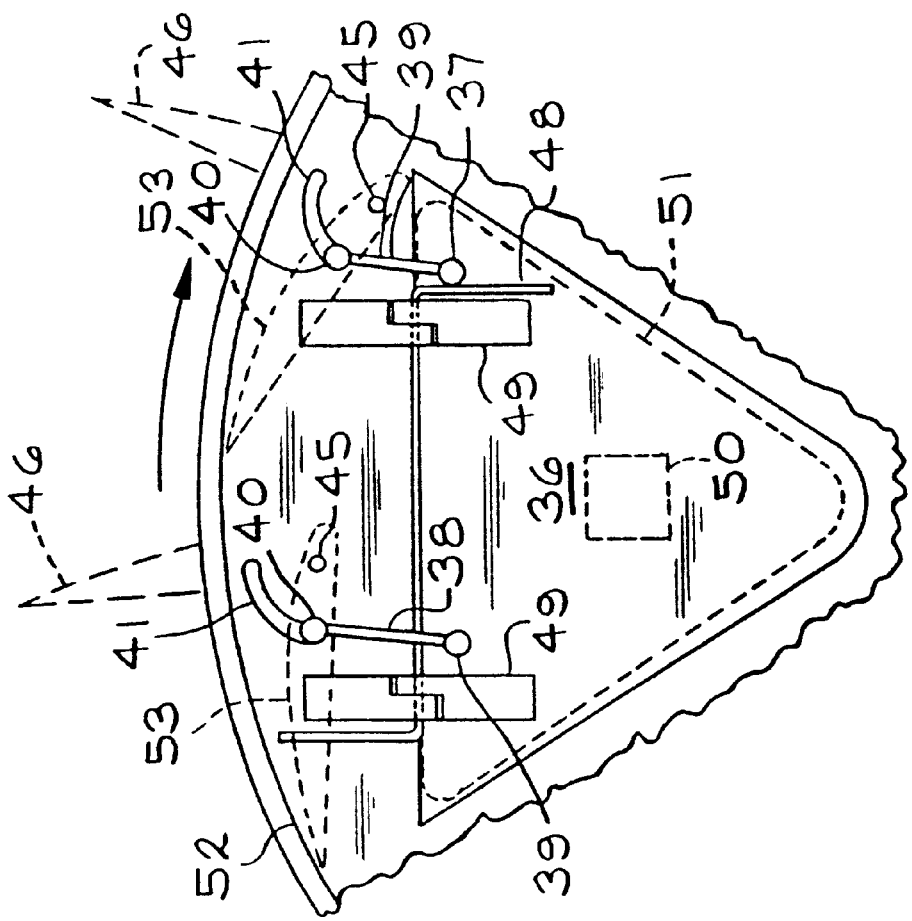
FIG. 7 is an enlarged fragmentary view of another embodiment of the rotor of FIG. 1 wherein wind actuated flaps are interconnected by push rods by which the position of the flaps is coordinated with the pitch of the adjustable blades of the rotor.
Figure 8:
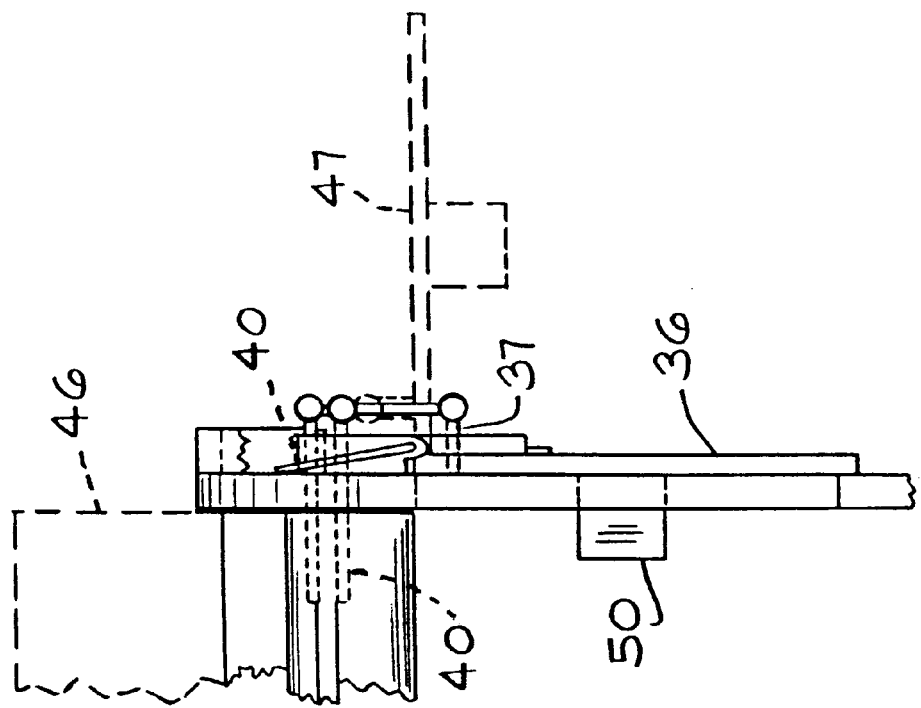
FIG. 8 is a side elevation view of the portion of the rotor shown in FIG. 7.

FIGS. 7 and 8 depict another embodiment of the invention incorporating a system of rigid connecting members such as rods or bars with adjustable joints such as a ball and socket joint at their ends as shown schematically in FIG. 8 by the unnumbered circles at the ends of the rods or bars for interconnection of gate flaps 36 to blades 53. As exemplified with a single flap, interconnecting rods 37 extending from a flap 36 are connected bar linking members 38 and 39 to bars 40 projecting from the end of each of the blades 53 through arcuate slots 41 in he rear wall of the rotor 52. When the flow-gate flap 36 is opened, each of the blades 53 is caused to move about a connected pivot spar 45 near the leading edge of the blades to increase the ultimate pitch angle. This position is shown in dotted lines at a position 46 when the flap 36 is raised to the dotted line position 47 shown in FIG. 8. A torque spring 48, supported by a pair of hinge brackets 49 hold the gate flap 36 closed against a flow-port 51 of the rotor 52 at low wind speeds. Optionally a counterweight 50 can be provided on the flap 36 depending upon weight of the flap and the design performance desired of the rotor 52.

In operation the flaps 36 are spring biased to initially open at a predetermined air pressure but as the rotor rotates, centrifugal force of rotation of the rotor assembly and flaps assists in opening the flaps still further. Release of the energy of high winds is thus effected by the centrifugal force which acts on the gate flap assembly to function as a governor in limiting the effects of high winds. In other words, when a high wind is present, the wind first acts against the biasing action of the springs which hold the gate flaps closed but, as rotation builds up, the centrifugal force of rotation acting on each flap assembly opens the flaps still further and releases the additional effects of the wind which would otherwise cause increased speed of rotation. A balance is thus established between a release of high winds through the flaps and the centrifugal force of rotation of the flaps 36. That is, the centrifugal force of a flap and counterweight assembly is reduced by rotor speed reduction caused by the by-pass of air through the flaps 36 rather than allowing its passage through the blades 16 thereby resulting in regulation of rotational speed.

In addition to such by-pass of air through the gate flaps 36 for regulation of speed, the blades 53 can be made automatically adjustable in position to adjust the amount of air passing between them. In this regard by biasing each of the featherable blades, such as with a spring, a predetermined pattern of different degrees of release of air between them can be established at different rotor speeds. That is, by providing for automatic feathering of the blades, the effect of high wind forces, which would otherwise cause a higher speed of rotation, can be subdued.

Three mechanisms are thus operable for regulation of the speed of a rotor under high winds. The mechanisms which can be arranged to function simultaneously or in sequence are namely the openable gate flap, the featherable blades and the positionable fly weights. Opening of the gate flaps 36 at the rear of the rotor for air release can be arranged to occur simultaneously with feathering of the blades 53 or operated in sequence one before the other or both together depending upon the tension of springs associated with each to regulate the speed of rotation of the turbine. In this regard, the blades and flaps can be arranged by selective adjustment of components dependent on weather experience in the specific region of use, that as wind velocity increases, feathering of the blades will be initiated before or after the flaps begin to open or simultaneously with the flaps or either the flaps or the blades first open to their maximum opening position before the other begin to open.

The flaps can be arranged to function responsive to the rotational speed of the rotor by providing a balancing counterweight 50 mounted on the back of each of the flaps 36. The centrifugal force of rotation of the flaps 36 and counterweights 50 in combination can be arranged to act to open the flaps 36 according to a rotational speed pattern determined by the position of the counterweights 50 with their respective gate flaps 36. In this respect the counterweights 50 each can be made adjustable in their position on their respective gate flap 36 both in their degree of projection from the back of the gate flap as well as their height position relative to the pivot line of the gate flap. As the flaps move out during rotor rotation, the moment arms of the counterweights about the flap hinges increase and their radius of rotation about the rotor axis also increases. The biasing springs acting on the flaps 36 in combination with the fly weights may therefore be selected and adjusted to exert a non-linear force with changes in rotor speed to avoid immediate full opening of the flaps and to avoid requiring a very low rotational speed to restore closure. The centrifugal force of the mass of the gate flap 36 and its associated counterweight 50 can thereby be varied in its effectiveness in dumping of air to regulate rotational speed of the rotor 52. Accordingly desired patterns of operation can be established as determined by trial and error adjustment and positioning of the fly weights 14.

Under still other circumstances such as for low level maximum wind conditions which might be calculated as likely to prevail in a region, the counterweights mounted on the flaps might be deleted and the biasing action of the spring 48 alone acting on each gate flap might be found adequate to provide the range of adjustability necessary to effect full opening of the flaps under the highest winds to be confronted.

In view of the foregoing it will be understood that many variations of the disclosed invention can be made within the broad scope of the principles embodied therein. Thus while particular preferred embodiments have been shown and described, it is intended by the appended claims to cover all such modifications which fall within the true spirit and scope of the invention.

I claim:

1. A fluid driven turbine comprising a rotor having an axis of rotation that is generally parallel to the direction of fluid flow, and a plurality of side-by side fluid engaging blades arranged peripherally around the rotor, a plurality of fluid outlet gaps defined between pairs of adjacent blades, and wherein the rotor has a front side and a back side, the front side of the rotor having an inlet for receiving incoming fluid, the back side of the rotor having a back panel member generally facing the direction of fluid flow for directing incoming fluid out through the fluid outlet gaps, thereby causing the rotor to rotate, the back panel member having at least one fluid outlet port and a door that covers the port to a variable extent depending on the velocity of incoming fluid.

2. The turbine of claim 1 wherein the back panel member has a plurality of fluid outlet ports, each port having a door that covers the port to a variable extent depending on the velocity of incoming fluid.

3. The turbine of claim 1 wherein the turbine is designed to be driven by wind.

4. The turbine of claim 1 wherein the back panel member has a plurality of fluid outlet ports, each port having a door that covers the port to a variable extent depending on the velocity of incoming fluid, each fluid outlet port being wedge shaped and having a narrowing width toward the rotational axis.

5. The turbine of claim 2, wherein the door is moveable relative to a stationary portion of the back panel member.

6. The turbine of claim 5, wherein the port has a boundary line along which the door is connected to the stationary portion of the back panel member.

7. The turbine of claim 6, wherein the door is hinged to the stationary portion of the back door along the boundary line.

8. The turbine of claim 7, further comprising a biasing mechanism urging the door toward a closed position over the port, wherein the biasing mechanism allows variable opening of the door in response to wind force.

9. The turbine of claim 1 further comprising an opening mechanism for the door which maintains the door in a completely closed position over the port when incoming fluid speed is near zero, and allows an increasing degree of opening of the door as wind speed increases above a predetermined level.

10. The turbine of claim 9 wherein the opening mechanism allows the door to passively open in response to wind speed.

11. The turbine of claim 6 wherein the boundary line is near the periphery of the rotor.

12. The turbine of claim 8 further comprising counterweights which operate in conjunction with the biasing mechanism to allow the desired extent of door opening as a function of wind speed.

13. The turbine of claim 9 wherein the opening mechanism allows the door to move to a completely open position under extreme wind forces above a predetermined velocity.

14. A method of releasing fluid pressure inside a radial flow rotor having a generally horizontal axis of rotation, a plurality of side-by side fluid engaging blades arranged peripherally around the rotor, and a back panel member generally facing a direction of fluid flow, comprising the steps of directing the rotor so that the axis of rotation of the rotor is substantially parallel to the direction of fluid force, opening a port in the back panel member in response to impinging fluid force that is generally normal to the panel member, and varying the extent of opening of the port as a function of fluid velocity.

15. The method of claim 14 wherein the varying step is performed passively in response to changes in fluid force.

16. The method of claim 14 wherein the fluid is wind.

17. The method of claim 14 further comprising the step of maintaining the port in a closed position when fluid force velocity is near zero.

18. The method of claim 14 wherein the varying step includes the step of increasing the extent of opening of the port as fluid force increases above a predetermined threshold.

* * * * *